US012296591B2

(12) United States Patent
Araki

(10) Patent No.: US 12,296,591 B2
(45) Date of Patent: May 13, 2025

(54) LIQUID DROPLET DISCHARGE HEAD AND RECORDING DEVICE

(71) Applicant: KYOCERA CORPORATION, Kyoto (JP)

(72) Inventor: Atsushi Araki, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 150 days.

(21) Appl. No.: 17/755,225

(22) PCT Filed: Oct. 28, 2020

(86) PCT No.: PCT/JP2020/040511
§ 371 (c)(1),
(2) Date: Apr. 25, 2022

(87) PCT Pub. No.: WO2021/085502
PCT Pub. Date: May 6, 2021

(65) Prior Publication Data

US 2022/0402268 A1 Dec. 22, 2022

(30) Foreign Application Priority Data

Oct. 31, 2019 (JP) ................................. 2019-199370

(51) Int. Cl.
*B41J 2/14* (2006.01)

(52) U.S. Cl.
CPC .................................. *B41J 2/1433* (2013.01)

(58) Field of Classification Search
CPC ...................................................... B41J 2/1433
See application file for complete search history.

(56) References Cited

U.S. PATENT DOCUMENTS

2015/0321474 A1* 11/2015 Ichizono .................. B41J 2/055
347/54

FOREIGN PATENT DOCUMENTS

| | | | | |
|---|---|---|---|---|
| JP | 2005254546 | A | * | 9/2005 |
| JP | 2007326323 | A | | 12/2007 |
| JP | 201036431 | A | | 2/2010 |
| JP | 2010036431 | A | * | 2/2010 |
| JP | 2013202857 | A | * | 10/2013 |
| JP | 201674230 | A | | 5/2016 |

* cited by examiner

*Primary Examiner* — Jason S Uhlenhake
(74) *Attorney, Agent, or Firm* — HAUPTMAN HAM, LLP

(57) ABSTRACT

A liquid droplet discharge head includes a reservoir having a slit portion through which a flexible substrate is extracted outward. A closing member is disposed in the slit portion, and a sealing resin is disposed on the closing member.

12 Claims, 22 Drawing Sheets

LIQUID DROPLET DISCHARGE HEAD AND RECORDING DEVICE

CROSS-REFERENCE TO RELATED APPLICATIONS

This application is national stage application of International Application No. PCT/JP2020/040511, filed on Oct. 28, 2020, which designates the United States, incorporated herein by reference, and which claims the benefit of priority from Japanese Patent Application No. 2019-199370, filed on Oct. 31, 2019.

TECHNICAL FIELD

The disclosed embodiments relate to a liquid droplet discharge head and a recording device.

BACKGROUND ART

Inkjet printers and inkjet plotters that utilize an inkjet recording method are known as printing apparatuses. A liquid droplet discharge head for discharging liquid is mounted in printing apparatuses utilizing such an inkjet method.

A piezoelectric method is one of liquid droplet discharge methods of such a liquid droplet discharge head. A liquid droplet discharge head employing the piezoelectric method has a structure in which a flexible substrate is extracted outward through a slit portion of a reservoir that supplies liquid. The slit portion is directly connected to an electrode portion to which the flexible substrate and a piezoelectric actuator substrate are electrically connected.

CITATION LIST

Patent Literature

Patent Document 1: JP 2007-326323 A
Patent Document 2: JP 2016-74230 A

SUMMARY OF INVENTION

A liquid droplet discharge head according to an aspect of an embodiment includes a reservoir including a slit portion through which a flexible substrate is extracted outward. A closing member is disposed in the slit portion, and a sealing resin is disposed on the closing member.

DESCRIPTION OF EMBODIMENTS

Embodiments of a liquid droplet discharge head and a recording device disclosed in the present application will be described in detail below with reference to the accompanying drawings. Note that the invention according to the present application is not limited to the embodiments that will be described below.

Inkjet printers and inkjet plotters that utilize an inkjet recording method are known as printing apparatuses. A liquid droplet discharge head for discharging liquid is mounted in printing apparatuses utilizing such an inkjet method.

A piezoelectric method is one of the methods for discharging liquid from a liquid discharge head. A liquid droplet discharge head employing the piezoelectric method has a structure in which a flexible substrate is extracted outward through a slit portion of a reservoir that supplies liquid. The slit portion is directly connected to an electrode portion to which the flexible substrate and a piezoelectric actuator substrate are electrically connected.

In order to protect the electrode portion, resin may be applied to the slit portion so as to seal the slit portion. In that case; however, not only a considerable amount of resin is required to seal the entire slit portion, but also unsolidified resin may flow into the electrode portion to cause an operation failure. Besides, there is no way to confirm whether or not the slit portion is completely sealed.

Therefore, in view of these problems, the method of sealing the slit portion described above is expected to be improved.

Printer Configuration

Figure 1:
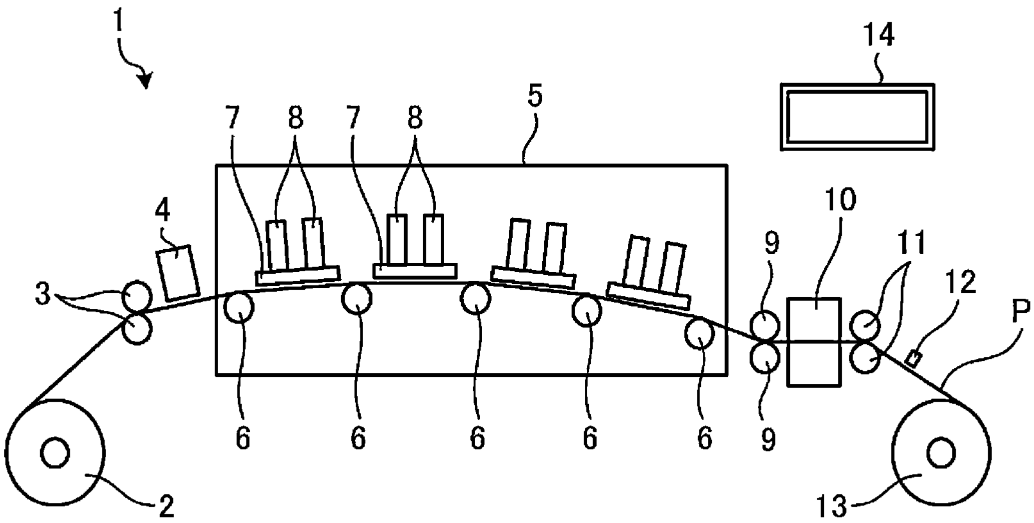
FIG. 1 is a schematic front view of a printer according to an embodiment.
Figure 2:
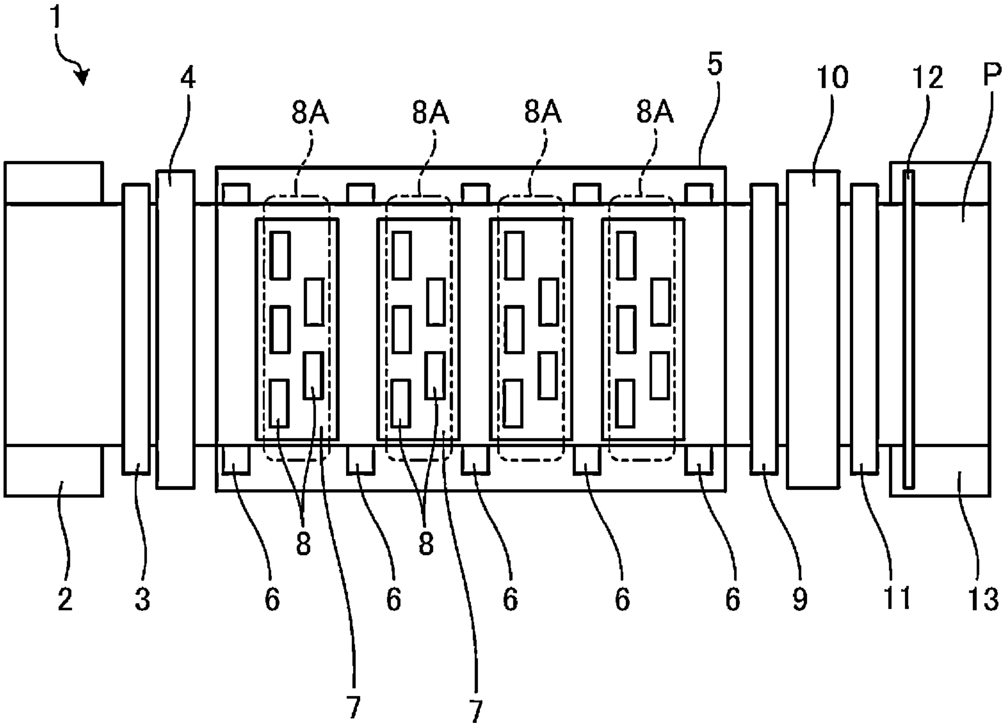
FIG. 2 is a schematic plan view of a printer according to the embodiment.

First, an overview of a printer 1 which is an example of a recording device according to an embodiment will be described with reference to FIGS. 1 and 2. FIG. 1 is a schematic front view of a printer 1 according to the embodiment. FIG. 2 is a schematic plan view of a printer 1 according to the embodiment.

As illustrated in FIG. 1, the printer 1 includes a paper feed roller 2, guide rollers 3, an applicator 4, a head case 5, a plurality of conveying rollers 6, a plurality of frames 7, a plurality of liquid discharge heads 8, conveying rollers 9, a dryer 10, conveying rollers 11, a sensor 12, and a collection roller 13.

The printer 1 further includes a controller 14 that controls each part of the printer 1. The controller 14 controls operations of the paper feed roller 2, the guide rollers 3, the applicator 4, the head case 5, the plurality of conveying rollers 6, the plurality of frames 7, the plurality of liquid discharge heads 8, the conveying rollers 9, the dryer 10, the conveying rollers 11, the sensor unit 12, and the collection roller 13.

By landing droplets on the printing sheet P, the printer 1 records images and characters on the printing sheet P. Before use, the printing sheet P is wound around the paper feed roller 2 and ready to be extracted. The printer 1 conveys the printing sheet P from the paper feed roller 2 to the inside of the head case 5 via the guide rollers 3 and the applicator 4.

The applicator 4 uniformly applies a coating agent over the printing sheet P. With surface treatment thus performed on the printing sheet P, the printing quality of the printer 1 can be improved.

The head case 5 houses the plurality of conveying rollers 6, the plurality of frames 7, and the plurality of liquid discharge heads 8. The inside of the head case 5 is formed with a space separated from the outside except for a part connected to the outside such as parts where the printing sheet P enters and exits.

If necessary, the controller 14 controls at least one of controllable factors of the internal space of the head case 5, such as temperature, humidity, and barometric pressure. The conveying rollers 6 convey the printing sheet P to the vicinity of the liquid discharge heads 8, inside the head case 5.

The frames 7 are rectangular flat plates, and are positioned above and close to the printing sheet P conveyed by the conveying rollers 6. As illustrated in FIG. 2, a plurality of (for example, four) frames 7 are provided inside the head case 5 such that the longitudinal direction of the frames 7 is orthogonal to the conveyance direction of the printing sheet P. Each of the plurality of frames 7 is disposed at a predetermined interval along the conveyance direction of the printing sheet P.

In the following description, the conveyance direction of the printing sheet P is also referred to as a "sub scanning direction," and a direction orthogonal to the sub scanning direction and parallel to the printing sheet P is also referred to as a "main scanning direction".

Liquid, for example, ink, is supplied to the liquid discharge heads 8 from a liquid tank (not illustrated). Each liquid discharge head 8 discharges the liquid supplied from the liquid tank.

The controller 14 controls the liquid discharge heads 8 based on data of an image, characters, and the like to discharge the liquid toward the printing sheet P. The distance between each liquid discharge head 8 and the printing sheet P is, for example, approximately 0.5 to approximately 20 mm.

The liquid discharge heads 8 are fixed to the frame 7. For example, the liquid discharge heads 8 are fixed to the frame 7 at both end portions in the longitudinal direction. The liquid discharge heads 8 are fixed to the frame 7 such that the longitudinal direction of the liquid discharge heads 8 are parallel to the main scanning direction.

That is, the printer 1 according to the embodiment is a so-called line printer in which the liquid discharge heads 8 are fixed inside the printer 1. Note that the printer 1 according to the embodiment is not limited to a line printer and may also be a so-called serial printer.

A serial printer is a printer employing a method of alternately performing operations of recording while moving the liquid discharge heads 8 in a manner such as reciprocation in a direction intersecting (for example, substantially orthogonal to) the conveyance direction of the printing sheet P, and conveying the printing sheet P.

As illustrated in FIG. 2, a plurality of (for example, five) liquid discharge heads 8 are provided in one frame 7. FIG. 2 illustrates an example in which two liquid discharge heads 8 are disposed on the front side and three liquid discharge heads 8 are disposed on the rear side in the sub scanning direction, in such a manner that the centers of the respective liquid discharge heads 8 do not overlap with each other in the sub scanning direction.

The plurality of liquid discharge heads 8 disposed in one frame 7 form a head group 8A. Four head groups 8A are positioned along the sub scanning direction. The liquid discharge heads 8 belonging to the same head group 8A are supplied with ink of the same color. As a result, the printer 1 can perform printing with four colors of ink using the four head groups 8A.

The colors of the ink discharged from the respective head groups 8A are, for example, magenta (M), yellow (Y), cyan (C), and black (K). The controller 14 can print a color image on the printing sheet P by controlling each of the head groups 8A to discharge the plurality of colors of ink onto the printing sheet P.

Note that a surface treatment may be performed on the printing sheet P, by discharging a coating agent from the liquid discharge heads 8 onto the printing sheet P.

Furthermore, the number of the liquid discharge heads 8 included in one head group 8A and the number of the head groups 8A provided in the printer 1 can be changed as appropriate in accordance with printing targets and printing conditions. For example, if the color to be printed on the printing sheet P is a single color and the range of the printing can be covered by a single liquid discharge head 8, only a single liquid discharge head 8 may be provided in the printer 1.

The printing sheet P thus subjected to the printing process inside the head case 5 is conveyed by the conveying rollers 9 to the outside of the head case 5, and passes through the inside of the dryer 10. The dryer 10 dries the printing sheet P after the printing process. The printing sheet P thus dried by the dryer 10 is conveyed by the conveying rollers 11 and then collected by the collection roller 13.

In the printer 1, by drying the printing sheet P with the dryer 10, it is possible to suppress bonding between the printing sheets P rolled while being overlapped with each other, and rubbing between undried liquid at the collection roller 13.

The sensor 12 includes a position sensor, a speed sensor, a temperature sensor, and the like. Based on information from the sensor 12, the controller 14 can determine the state of each part of the printer 1 and control each part of the printer 1.

In the printer 1 described above, the printing sheet P is a printing target (that is, a recording medium), but a printing target in the printer 1 is not limited to the printing sheet P, and a roll type fabric or the like may be a printing target.

In addition, instead of directly conveying the printing sheet P, the printer 1 may have a configuration in which the printing sheet P is put on a conveyor belt and conveyed. By using the conveyor belt, the printer 1 can perform printing on a sheet of paper, a cut cloth, wood, a tile, or the like as a printing target.

Further, the printer 1 described above may discharge a liquid containing electrically conductive particles from the liquid discharge heads 8, to print a wiring pattern or the like of an electronic device.

Furthermore, the printer 1 described above may discharge a liquid containing a predetermined amount of liquid chemical agent or liquid containing the chemical agent from the liquid discharge heads 8 onto a reaction vessel or the like to produce chemicals.

The printer 1 described above may also include a cleaner for cleaning the liquid discharge heads 8. The cleaner cleans the liquid discharge heads 8 by, for example, a wiping process or a capping process.

The wiping process is, for example, a process of using a flexible wiper to rub a second surface 21*b* (see FIG. 6) of a channel member 21 (see FIG. 3), which is an example of a surface of a portion from which a liquid is discharged, thereby removing the liquid attached to the second surface 21*b*.

The capping process is, for example, a process of removing clogging of discharge holes 63 (see FIG. 4) by covering a portion from which a liquid is discharged with a cap, and repeating the discharging of the liquid. This process is performed as described below. First, a cap is provided so as to cover the second surface 21*b* of the channel member 21 which is an example of the portion from which the liquid is discharged (this action is referred to as capping). This action forms a substantially sealed space between the second surface 21*b* and the cap. The discharge of liquid is then repeated in such a sealed space. This can remove a liquid having a viscosity higher than that in the normal state, foreign matter, or the like that has clogged a discharge hole 63.

Configuration of Liquid Discharge Head

Figure 3:
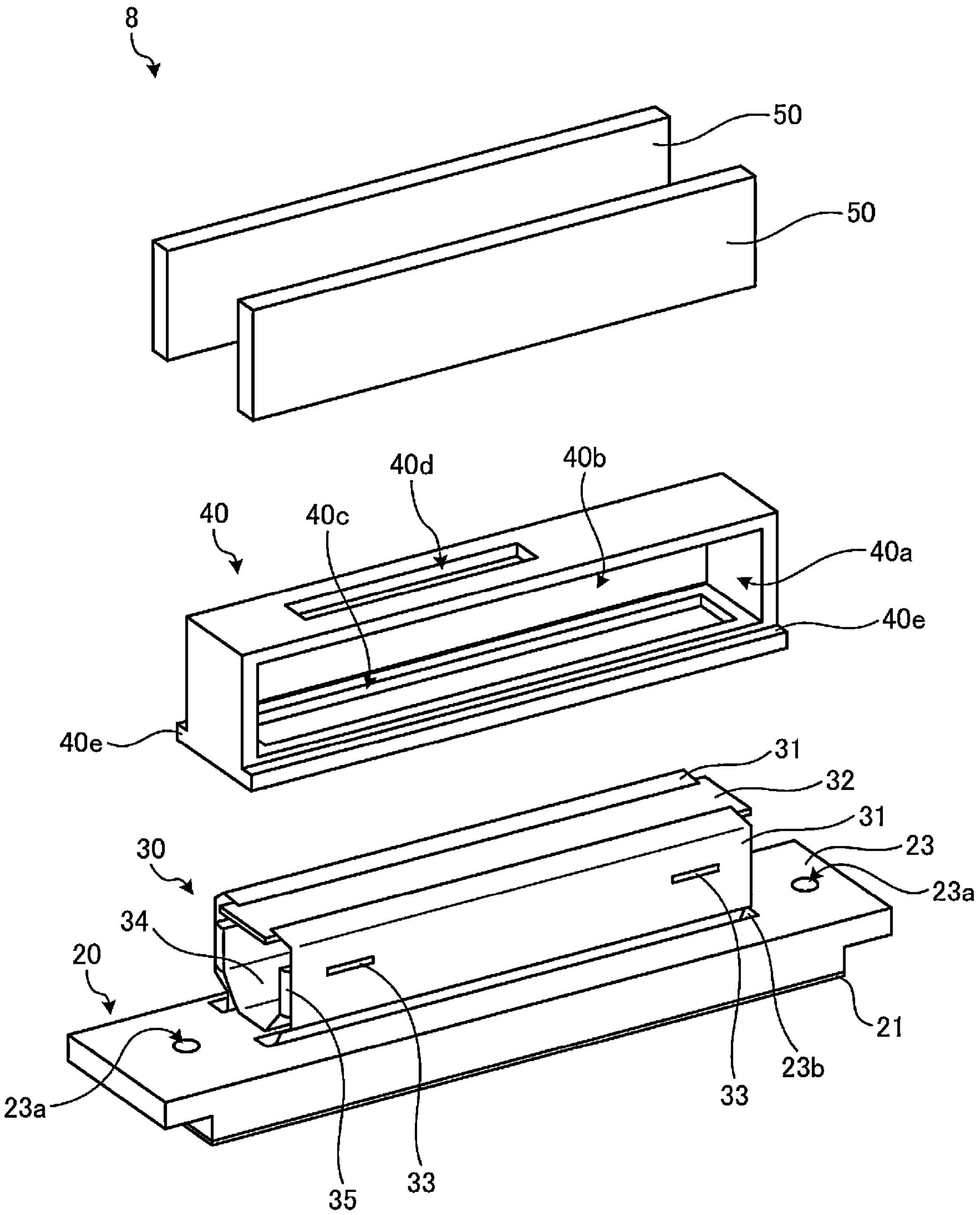
FIG. 3 is an exploded perspective view illustrating a schematic configuration of a liquid discharge head according to the embodiment.

A configuration of the liquid discharge head 8 according to the embodiment will be described with reference to FIG. 3. FIG. 3 is an exploded perspective view illustrating a schematic configuration of the liquid discharge head 8 according to the embodiment.

The liquid discharge head 8 includes a head body 20, a wiring portion 30, a housing 40, and a pair of heat dissipation plates 50. The head body 20 includes the channel member 21, a piezoelectric actuator substrate 22 (see FIG. 4), and a reservoir 23.

In the following description, for the purpose of convenience, a direction in which the head body 20 is provided in the liquid discharge head 8 may be referred to as "downward," and a direction in which the housing 40 is provided relative to the head body 20 may be referred to as "upward".

The channel member 21 of the head body 20 has a substantially flat plate shape, and includes a first surface 21*a* (see FIG. 6), which is one main surface, and the second surface 21*b* (see FIG. 6) located at an opposite side from the first surface 21*a*. The first surface 21*a* has an opening 61*a* (see FIG. 4), and a liquid is supplied into the channel member 21 from the reservoir 23 through the opening 61*a*.

A plurality of discharge holes 63 (see FIG. 4) used to discharge the liquid onto the printing sheet P are provided on the second surface 21*b*. A channel through which a liquid flows from the first surface 21*a* to the second surface 21*b* is formed inside the channel member 21.

The piezoelectric actuator substrate 22 is located on the first surface 21*a* of the channel member 21. The piezoelectric actuator substrate 22 includes a plurality of displacement elements 70 (see FIG. 6). In addition, a flexible substrate 31 of the wiring portion 30 is electrically connected to the piezoelectric actuator substrate 22.

The reservoir 23 is disposed on the piezoelectric actuator substrate 22. The reservoir 23 includes an opening 23*a* at both end portions thereof in the main scanning direction. The reservoir 23 has a channel therein, and is supplied with a liquid from the outside through the opening 23*a*. The reservoir 23 has a function of supplying the liquid to the channel member 21 and a function of storing the liquid to be supplied.

The wiring portion 30 includes the flexible substrate 31, a wiring board 32, a plurality of driver ICs 33, a pressing member 34, and an elastic member 35. The flexible substrate 31 has a function of transferring a predetermined signal sent from the outside to the head body 20. Note that, as illustrated in FIG. 3, the liquid discharge head 8 according to the embodiment includes two flexible substrates 31.

One end portion of the flexible substrate 31 is electrically connected to the piezoelectric actuator substrate 22 of the head body 20. The other end portion of the flexible substrate 31 is extracted upward so as to be inserted into a slit portion 23*b* of the reservoir 23, and is electrically connected to the wiring board 32. This enables the piezoelectric actuator substrate 22 of the head body 20 and the outside to be electrically connected.

The wiring board 32 is located above the head body 20. The wiring board 32 has a function of distributing a signal to the plurality of driver ICs 33.

The plurality of driver ICs 33 are provided on one main surface of the flexible substrate 31. As illustrated in FIG. 3, in the liquid discharge head 8 according to the embodiment, two driver ICs 33 are provided on one flexible substrate 31, but the number of driver ICs 33 provided on one flexible substrate 31 is not limited to two.

The driver IC 33 drives the piezoelectric actuator substrate 22 of the head body 20 on the basis of a signal transmitted from the controller 14 (see FIG. 1). With this configuration, the driver IC 33 drives the liquid discharge head 8.

The pressing member 34 is substantially U-shaped in a cross-sectional view, and is configured to press the driver IC 33 on the flexible substrate 31 toward the heat dissipation plate 50 from the inner side. With this configuration, the embodiment enables heat generated when the driver IC 33 drives to be efficiently dissipated to the heat dissipation plate 50 on the outer side.

The elastic member 35 is provided so as to be in contact with an outer wall of a pressing portion (not illustrated) of the pressing member 34. By providing the elastic member 35, it is possible to reduce the likelihood of the pressing member 34 damaging the flexible substrate 31 at the time when the pressing member 34 presses the driver IC 33.

The elastic member 35 is made of, for example, double-sided foam tape or the like. In addition, for example, by using a non-silicon-based thermal conductive sheet for the elastic member 35, it is possible to improve the heat dissipating property of the driver IC 33. Note that the elastic member 35 does not necessarily have to be provided.

The housing 40 is disposed on the head body 20 so as to cover the wiring portion 30. This enables the wiring portion 30 to be sealed with the housing 40. The housing 40 is made of, for example, a resin or a metal or the like.

The housing 40 has a box shape extending in the main scanning direction, and includes a first opening 40*a* and a second opening 40*b* on a pair of side surfaces opposed to each other along the main scanning direction. In addition, the housing 40 includes a third opening 40*c* at a lower surface, and includes a fourth opening 40*d* at an upper surface.

One of the heat dissipation plates 50 is disposed on the first opening 40*a* so as to close the first opening 40*a*. The other of the heat dissipation plates 50 is disposed on the second opening 40*b* so as to close the second opening 40*b*.

The heat dissipation plates 50 are provided so as to extend in the main scanning direction, and are made of a metal, an alloy, or the like having a high heat dissipating property. The heat dissipation plates 50 are provided so as to be in contact with the driver ICs 33, and have a function of dissipating heat generated by the driver ICs 33.

The pair of heat dissipation plates 50 are fixed to the housing 40 respectively with screws not illustrated. Thus, the housing 40 to which the heat dissipation plates 50 are fixed has a box shape in which the first opening 40*a* and the second opening 40*b* are closed and the third opening 40*c* and the fourth opening 40*d* are open.

The third opening 40*c* is provided so as to be opposed to the reservoir 23. The flexible substrate 31 and the pressing member 34 are inserted into the third opening 40*c*.

The fourth opening 40*d* is provided in order to insert a connector (not illustrated) provided on the wiring board 32. It is preferable that a portion between the connector and the fourth opening 40*d* be sealed using resin or the like. This makes it possible to suppress entry of a liquid, dust, or the like into the housing 40.

Furthermore, the housing 40 includes thermal insulation portions 40*e*. The thermal insulation portions 40*e* are provided so as to be adjacent to the first opening 40*a* and the second opening 40*b*, and are provided so as to protrude outward from side surfaces of the housing 40 along the main scanning direction.

In addition, the thermal insulation portions 40*e* are formed so as to extend in the main scanning direction. That is, the thermal insulation portions 40*e* are located between the heat dissipation plates 50 and the head body 20. By providing the housing 40 with the thermal insulation portions 40*e* in this manner, it is possible to suppress transfer of heat generated by the driver ICs 33 through the heat dissipation plates 50 to the head body 20.

Note that, FIG. 3 illustrates an example of the configuration of the liquid discharge head 8, and the liquid discharge head 8 may further include components other than those illustrated in FIG. 3.

Configuration of Head Body

Figure 4:
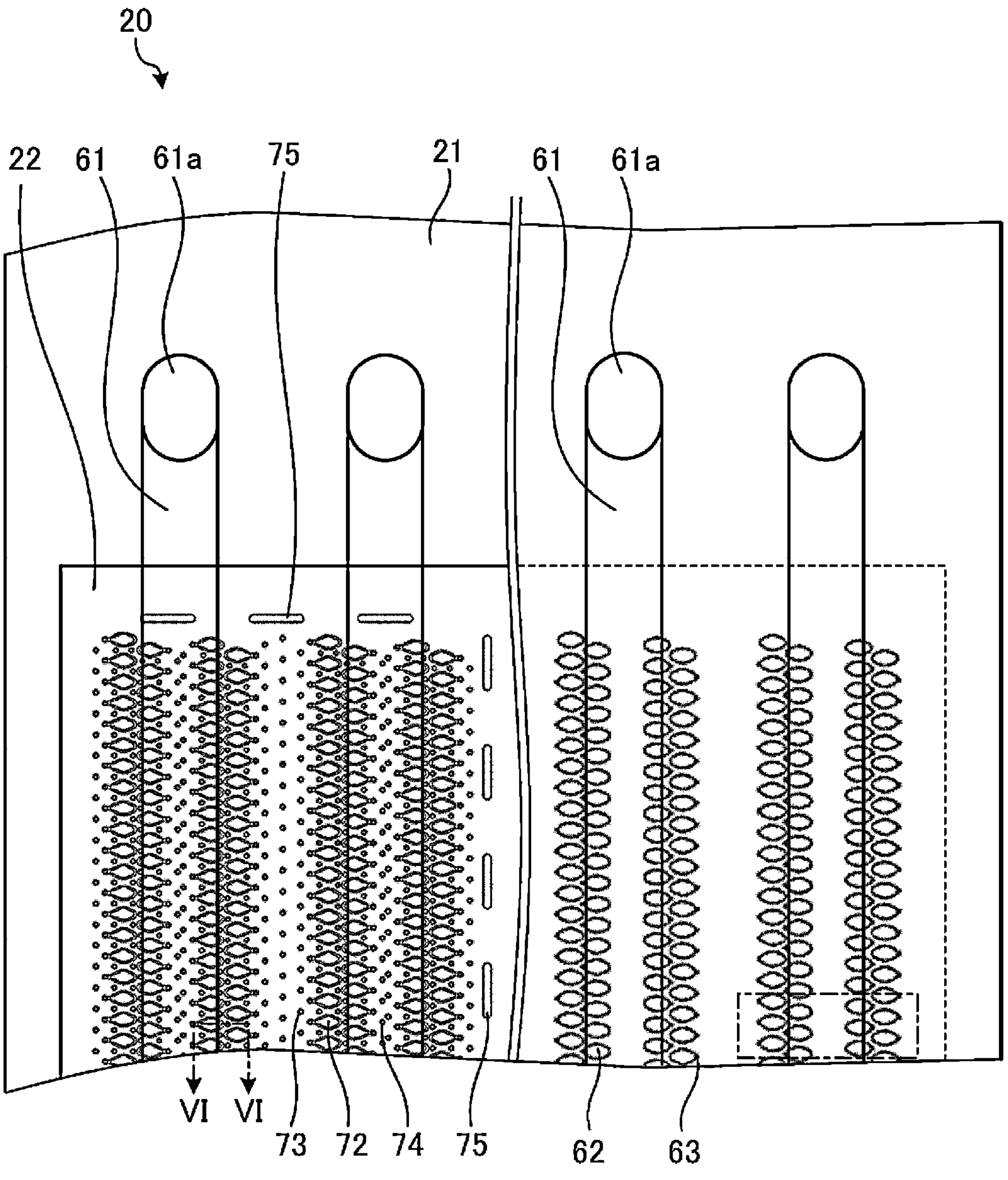
FIG. 4 is an enlarged plan view of a head body according to the embodiment.
Figure 5:
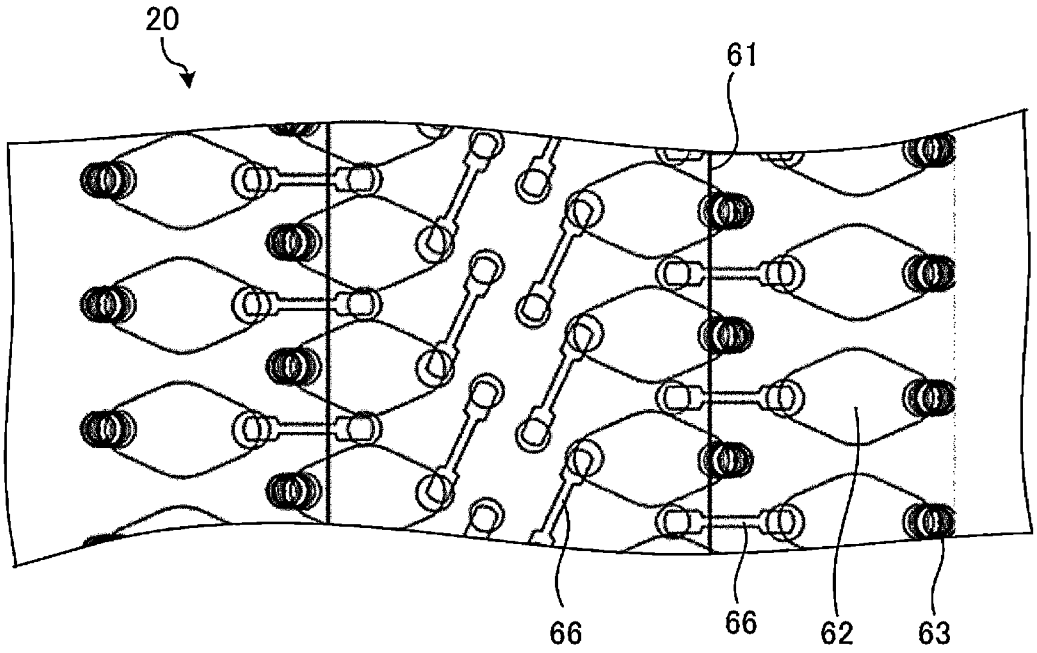
FIG. 5 is an enlarged view of a region in the dot-dash line in FIG. 4.
Figure 6:
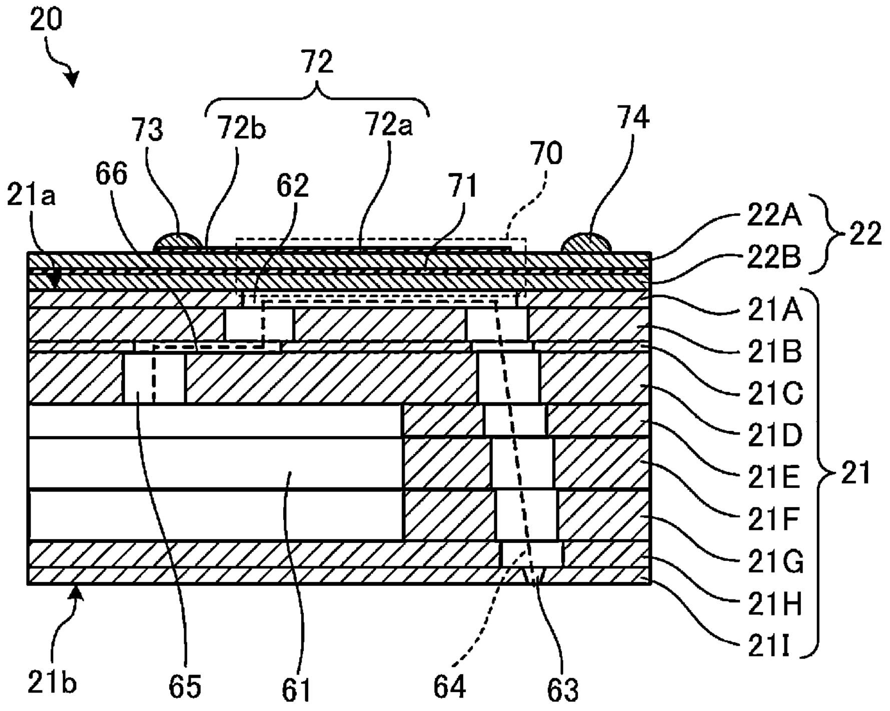
FIG. 6 is a cross-sectional view taken along the line VI-VI illustrated in FIG. 4.

A configuration of the head body 20 according to the embodiment will be described with reference to FIGS. 4 to 6. FIG. 4 is an enlarged plan view of the head body 20 according to the embodiment. FIG. 5 is an enlarged view of a region surrounded by a dot-dash line illustrated in FIG. 4. FIG. 6 is a cross-sectional view taken along the line VI-VI illustrated in FIG. 4.

As illustrated in FIG. 4, the head body 20 includes the channel member 21 and the piezoelectric actuator substrate 22. The channel member 21 includes a supply manifold 61, a plurality of pressurizing chambers 62, and a plurality of discharge holes 63.

The plurality of pressurizing chambers 62 are connected to the supply manifold 61. The plurality of discharge holes 63 are each connected to corresponding one of the plurality of pressurizing chambers 62.

Each of the pressurizing chambers 62 opens to the first surface 21*a* (see FIG. 6) of the channel member 21. Furthermore, the first surface 21*a* of the channel member 21 has an opening 61*a* that communicates with the supply manifold 61. In addition, a liquid is supplied from the reservoir 23 (see FIG. 2) through the opening 61*a* to the inside of the channel member 21.

In the example illustrated in FIG. 4, the head body 20 has four supply manifolds 61 located inside the channel member 21. Each of the supply manifolds 61 has a long thin shape extending along the longitudinal direction (that is, in the main scanning direction) of the channel member 21. At both ends of the supply manifold 61, the opening 61*a* of the supply manifold 61 is formed on the first surface 21*a* of the channel member 21.

In the channel member 21, a plurality of pressurizing chambers 62 are formed so as to expand two-dimensionally. As illustrated in FIG. 5, each of the pressurizing chambers 62 is a hollow region having a substantially diamond planar shape with corner portions being rounded. The pressurizing chamber 62 opens to the first surface 21*a* of the channel member 21, and is closed by the piezoelectric actuator substrate 22 being bonded to the first surface 21*a*.

The pressurizing chambers 62 form a pressurizing chamber row arrayed in the longitudinal direction. The pressurizing chambers 62 in two adjacent pressurizing chamber rows are arranged in a staggered manner between the two pressurizing chamber rows. In addition, one pressurizing chamber group includes four pressurizing chamber rows connected to one supply manifold 61. In the example illustrated in FIG. 4, the channel member 21 includes four pressurizing chamber groups.

Furthermore, relative arrangements of the pressurizing chambers 62 within individual pressurizing chamber groups are configured in the same manner, and the pressurizing chamber groups are arranged in a manner such that they are slightly shifted from each other in the longitudinal direction.

The discharge holes 63 are disposed at positions of the channel member 21 other than a region that is opposed to the supply manifold 61. That is, the discharge holes 63 do not overlap with the supply manifold 61 in a transparent view of the channel member 21 from the first surface 21*a* side.

Furthermore, in a plan view, the discharge holes 63 are disposed within a region in which the piezoelectric actuator substrate 22 is mounted. One group of such discharge holes 63 occupies a region having approximately the same size and shape as the piezoelectric actuator substrate 22.

Then, the displacement element 70 (see FIG. 6) of a corresponding piezoelectric actuator substrate 22 is caused to be displaced, thereby discharging droplets from the discharge hole 63.

As illustrated in FIG. 6, the channel member 21 has a layered structure in which a plurality of plates are layered. These plates include a cavity plate 21A, a base plate 21B, an aperture plate 21C, a supply plate 21D, manifold plates 21E, 21F, and 21G, a cover plate 21H, and a nozzle plate 21I arranged in this order from the upper surface of the channel member 21.

A large number of holes are formed in these plates. The thickness of each of the plates is approximately 10 μm to approximately 300 μm. With this configuration, the holes can be formed with high accuracy. The individual plates are layered while aligned with respect to each other such that these holes communicate with each other to form a predetermined channel.

In the channel member 21, the supply manifold 61 and the discharge hole 63 communicate through an individual channel 64. The supply manifold 61 is located on the second surface 21*b* side within the channel member 21, and the discharge hole 63 is located at the second surface 21*b* of the channel member 21.

The individual channel 64 includes a pressurizing chamber 62 and an individual supply channel 65. The pressurizing chamber 62 is located at the first surface 21*a* of the channel member 21. The individual supply channel 65 serves as a channel that connects the supply manifold 61 and the pressurizing chamber 62.

In addition, the individual supply channel 65 includes a reduction portion 66 having a width narrower than other portions. The reduction portion 66 has a width narrower than other portions of the individual supply channel 65, and hence, has a high channel resistance. In this manner, when the channel resistance of the reduction portion 66 is high, pressure occurring at the pressurizing chamber 62 is less likely to escape to the supply manifold 61.

The piezoelectric actuator substrate 22 includes piezoelectric ceramic layers 22A and 22B, a common electrode 71, an individual electrode 72, a connecting electrode 73, a dummy connecting electrode 74, and a front surface electrode 75 (see FIG. 4).

The piezoelectric actuator substrate 22 has the piezoelectric ceramic layer 22A, the common electrode 71, the piezoelectric ceramic layer 22B, and the individual electrode 72 layered in this order.

Both of the piezoelectric ceramic layers 22A and 22B each extend over the first surface 21*a* of the channel member 21 so as to extend across the plurality of pressurizing chambers 62. The piezoelectric ceramic layers 22A and 22B each have a thickness of approximately 20 μm. For example, the piezoelectric ceramic layers 22A and 22B are made of a lead zirconate titanate (PZT)-based ceramic material having ferroelectricity.

The common electrode 71 is formed over substantially the entire surface in a surface direction of a region between the piezoelectric ceramic layer 22A and the piezoelectric ceramic layer 22B. That is, the common electrode 71 overlaps with all the pressurizing chambers 62 in the region that is opposed to the piezoelectric actuator substrate 22.

The thickness of the common electrode 71 is approximately 2 μm. For example, the common electrode 71 is made of a metal material such as an Ag—Pd based material.

The individual electrode 72 includes a body electrode 72*a* and an extraction electrode 72*b*. The body electrode 72*a* is located in a region of the piezoelectric ceramic layer 22B that is opposed to the pressurizing chamber 62. The body electrode 72*a* is slightly smaller than the pressurizing chamber 62, and has a shape substantially similar to that of the pressurizing chamber 62.

The extraction electrode 72*b* is extracted out from the body electrode 72*a* to be outside the region that is opposed to the pressurizing chamber 62. The individual electrode 72 is made of, for example, a metal material such as an Au-based material.

The connecting electrode 73 is located on the extraction electrode 72*b*, and is formed to have a convex shape with a thickness of approximately 15 μm. The connecting electrode 73 is electrically connected to an electrode provided on the flexible substrate 31 (see FIG. 3). The connecting electrode 73 is made of, for example, silver-palladium, including glass frit.

The dummy connecting electrode 74 is located on the piezoelectric ceramic layer 22B and is positioned so as not to overlap with various electrodes such as the individual electrode 72. The dummy connecting electrode 74 connects the piezoelectric actuator substrate 22 and the flexible substrate 31 to increase the connection strength.

Furthermore, the dummy connecting electrode 74 makes uniform distribution of the contact positions between the piezoelectric actuator substrate 22 and the piezoelectric actuator substrate 22, and stabilizes the electrical connection. The dummy connecting electrode 74 is preferably made of a material equivalent to that of the connecting electrode 73, and is preferably formed in a process equivalent to that of the connecting electrode 73.

The front surface electrode 75 illustrated in FIG. 4 is formed on the piezoelectric ceramic layer 22B and at a position that does not interfere with the individual electrode 72. The front surface electrode 75 is connected to the common electrode 71 through a via hole formed in the piezoelectric ceramic layer 22B.

With this configuration, the front surface electrode 75 is grounded and maintained at the ground electric potential. The front surface electrode 75 is preferably made of a material equivalent to that of the individual electrode 72, and is preferably formed in a process equivalent to that of the individual electrode 72.

A plurality of individual electrodes 72 are individually electrically connected to the controller 14 (see FIG. 1) via the flexible substrate 31 and wiring, in order to individually control the electric potential of each individual electrode 72. By setting the individual electrode 72 and the common electrode 71 to have different electric potentials, and applying an electric field in the polarization direction of the piezoelectric ceramic layers 22A, the portion of the piezoelectric ceramic layer 22A to which the electric field is applied operates as an activation section distorted due to a piezoelectric effect.

In other words, in the piezoelectric actuator substrate 22, portions of the individual electrode 72, the piezoelectric ceramic layer 22A, and the common electrode 71 that are opposed to the pressurizing chamber 62 function as the displacement element 70.

In addition, unimorph deformation of the displacement element 70 results in the pressurizing chamber 62 being pressed and a liquid being discharged from the discharge hole 63.

Next, a procedure of driving the liquid discharge head 8 according to the embodiment will be described. The individual electrode 72 is set to be at a higher electric potential (hereinafter, also referred to as a "high electric potential") than the common electrode 71 in advance. Then, each time a discharge request is made, the individual electrode 72 is once set to be the same electric potential (hereinafter, referred as a "low electric potential") as the common electrode 71, and then is again set at the high electric potential at a predetermined timing.

With this configuration, at the timing when the individual electrode 72 changes to the low electric potential, the piezoelectric ceramic layers 22A and 22B return to their original shapes, and the volume of the pressurizing chamber 62 increases to be higher than the initial state, that is, higher than the state of the high electric potential.

At this time, negative pressure is applied to the inside of the pressurizing chamber 62. Thus, a liquid in the supply manifold 61 is sucked into the interior of the pressurizing chamber 62.

After this, the piezoelectric ceramic layers 22A and 22B deform so as to protrude toward the pressurizing chamber 62 at the timing when the individual electrode 72 is again set to the high electric potential.

In other words, the inside of the pressurizing chamber 62 has a positive pressure as a result of a reduction in the volume of the pressurizing chamber 62. Thus, the pressure of the liquid within the pressurizing chamber 62 rises, and droplets are discharged from the discharge hole 63.

In other words, in order to discharge droplets from the discharge hole 63, the controller 14 supplies a drive signal including pulses based on the high electric potential to the individual electrode 72 using the driver IC 33. It is only necessary to set the pulse width to an acoustic length (AL) that is a length of time for a pressure wave to propagate from the reduction portion 66 to the discharge hole 63.

With this configuration, when the inside of the pressurizing chamber 62 changes from the negative pressure state to the positive pressure state, the pressures under both of the states are combined, which makes it possible to discharge the droplets with higher pressure.

In addition, in a case of gray scale printing, the gray scale is expressed based on the number of droplets continuously discharged from the discharge hole 63, that is, the amount (volume) of droplets adjusted based on the number of times the droplets are discharged. Thus, the droplets are discharged a number of times corresponding to the designated gray scale to be expressed, through the discharge hole 63 corresponding to the designated dot region.

In general, when the liquid discharge is continuously performed, an interval between the pulses that are supplied to discharge the droplets may be set to the AL. Due to this, a period of a residual pressure wave of pressure generated in discharging the droplets discharged earlier matches a period of a pressure wave of pressure to be generated in discharging droplets to be discharged later.

Thus, the residual pressure wave and the pressure wave are superimposed, whereby the droplets can be discharged with a higher pressure. Note that in this case, the speed of the droplets to be discharged later is increased, and the impact points of the plurality of droplets become close.

Details of Reservoir

Figure 7:
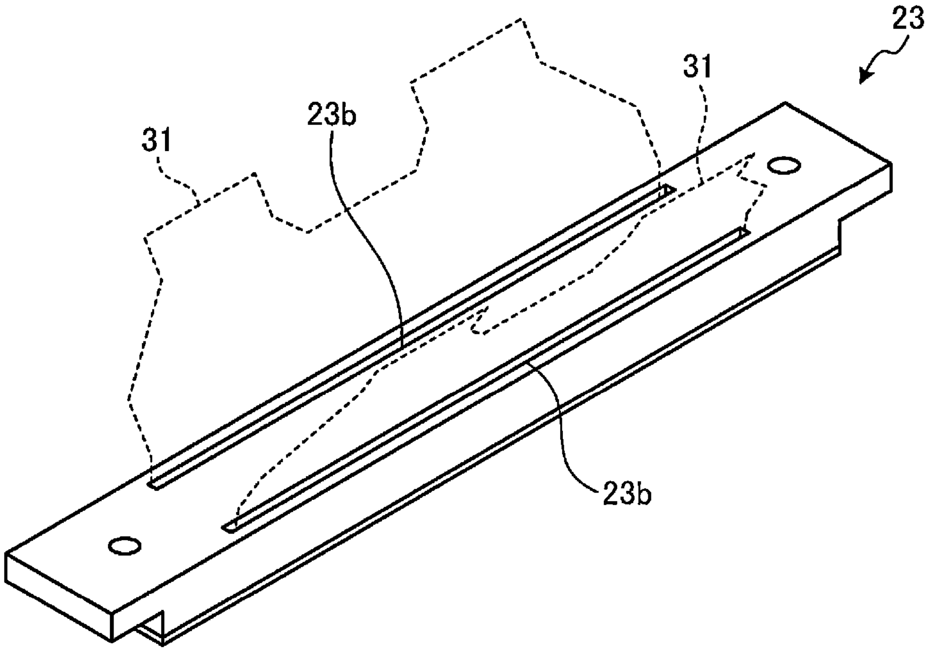
FIG. 7 is a perspective view illustrating an outer appearance configuration of a reservoir according to the embodiment.
Figure 8:
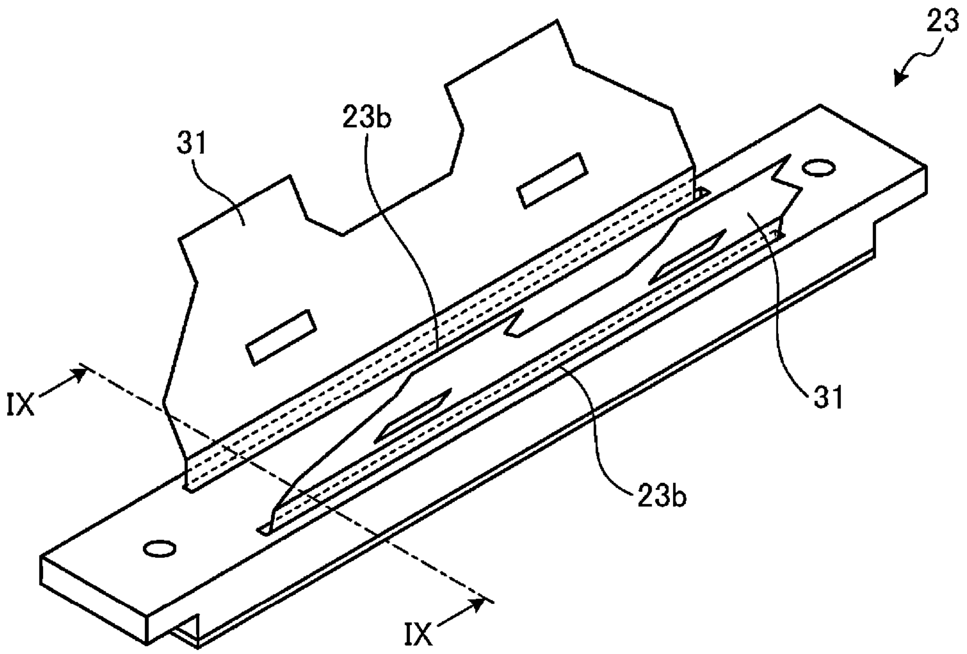
FIG. 8 is a perspective view illustrating an outer appearance configuration of a reservoir according to the embodiment.
Figure 9:
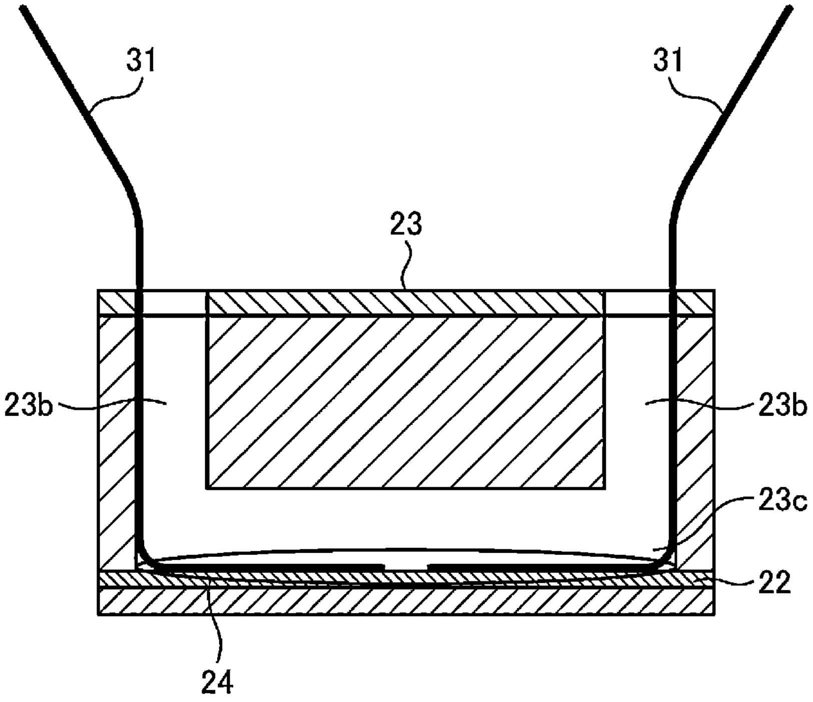
FIG. 9 is a cross-sectional view taken along the line IX-IX illustrated in FIG. 8.
Figure 10:
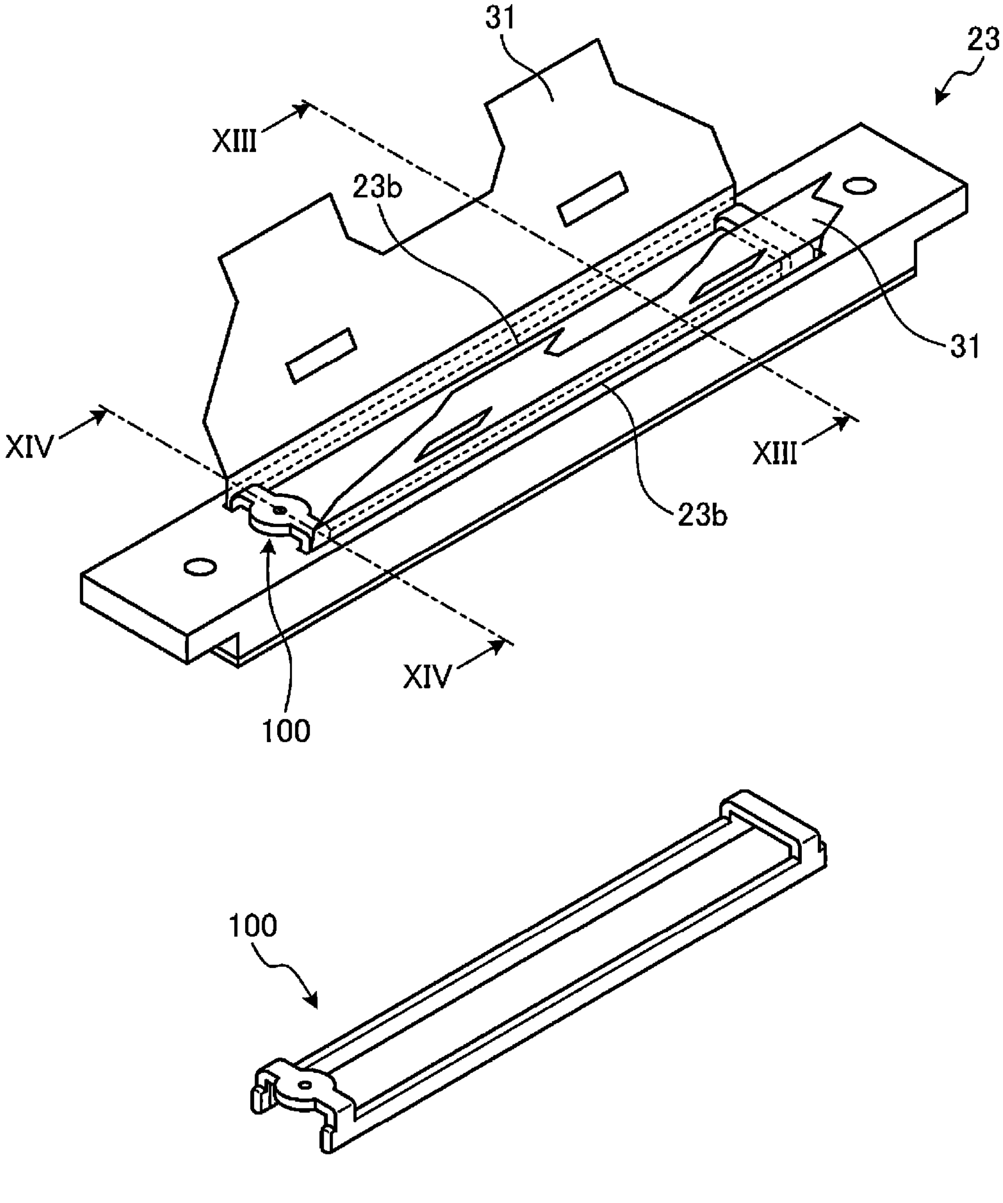
FIG. 10 is a perspective view illustrating an outer appearance configuration in which a closing member is disposed on a reservoir according to the embodiment.

Details of the reservoir 23 according to the embodiment will be described with reference to FIGS. 7 to 10. FIGS. 7 and 8 are perspective views illustrating an outer appearance configuration of the reservoir 23 according to the embodiment. FIG. 9 is a cross-sectional view taken along the line IX-IX illustrated in FIG. 8. FIG. 10 is a perspective view illustrating an outer appearance configuration in which the closing member 100 is disposed on the reservoir 23 according to the embodiment.

As illustrated in FIG. 7, the reservoir 23 includes a pair of slit portions 23*b* provided along the longitudinal direction of the reservoir 23. The slit portion 23*b* is a groove-like gap having a substantially square cross-sectional shape. The slit portion 23*b* opens in a substantially square planar shape in the upper surface of the reservoir 23, and communicates between the outside of the reservoir 23 and a hollow inner region 23*c* (see FIG. 9) formed inside the reservoir 23. For example, the slit portion 23*b* can be formed by drilling the reservoir 23 vertically along the thickness direction of the reservoir 23 by means of cutting or the like, or can be formed by molding integrally with the reservoir 23 using a predetermined mold form or the like prepared in advance.

FIG. 7 illustrates an example in which a plurality of slit portions 23*b* are provided in the reservoir 23, but the configuration is not particularly limited to this example. Further, FIG. 7 illustrates an example of the shape of the slit portion 23*b* provided in the reservoir 23, and the shape of the slit portion 23*b* is not particularly limited to the example illustrated in FIG. 7, and can be appropriately changed as necessary.

As illustrated in FIG. 8, the flexible substrate 31 extracted upward from the inside of the reservoir 23 is inserted into the slit portion 23*b*. Further, as illustrated in FIG. 9, the slit portion 23*b* is directly connected to an electrode portion 24 that is a region to which the flexible substrate 31 and the piezoelectric actuator substrate 22 are electrically connected.

As illustrated in FIG. 10, in the reservoir 23 including the slit portion 23*b* as illustrated in FIGS. 7 to 9, a closing member 100 is disposed in the slit portion 23*b* so as to close the slit portion 23*b*. Then, in the reservoir 23, the closing member 100 is disposed in the slit portion 23*b* and a sealing resin (not illustrated) is disposed on the closing member 100.

Disposed State of Closing Member

Figure 11:
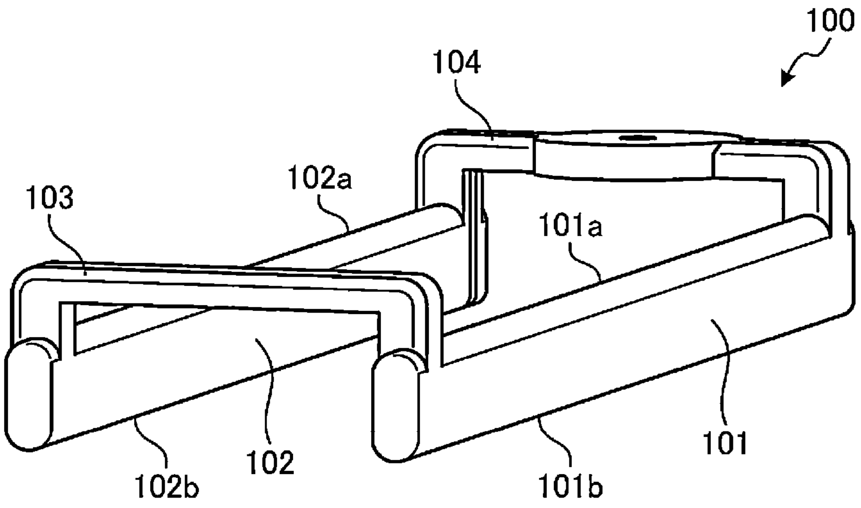
FIG. 11 is a perspective view illustrating an outer appearance configuration of a closing member according to the embodiment.
Figure 12:
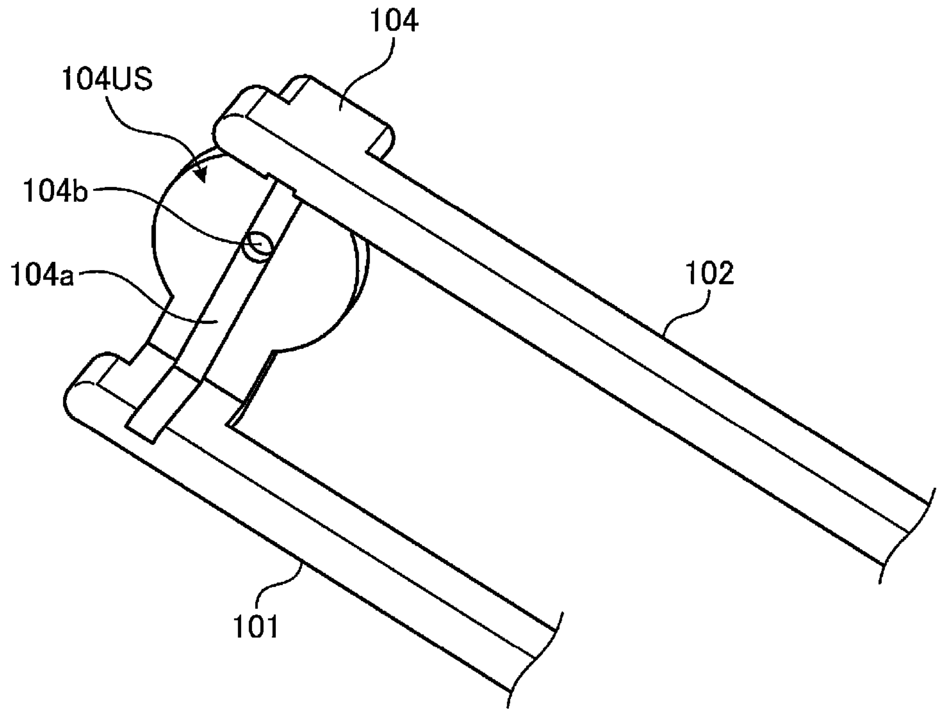
FIG. 12 is a perspective view illustrating an outer appearance configuration of a closing member according to the embodiment.
Figure 13:
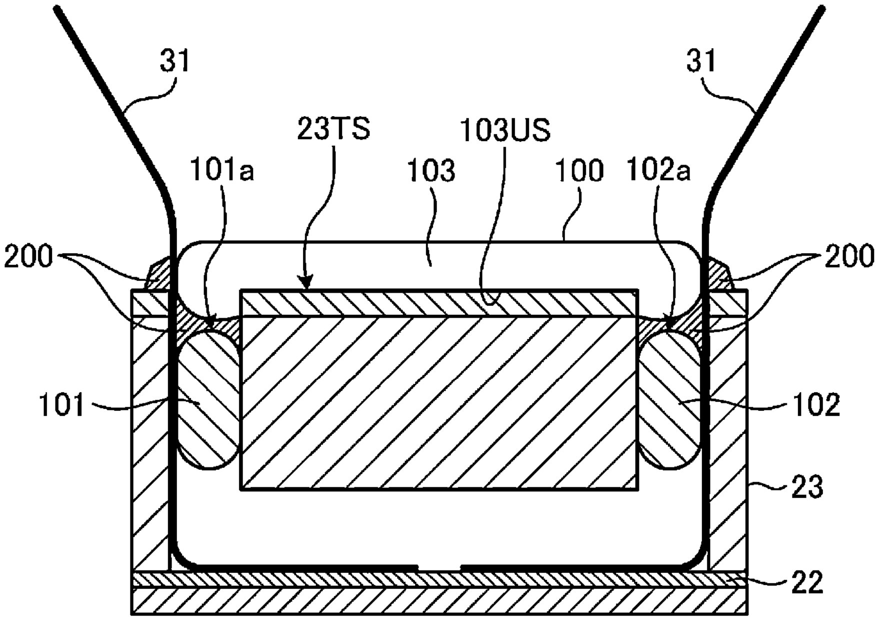
FIG. 13 is a cross-sectional view taken along the line XIII-XIII illustrated in FIG. 10.
Figure 14:
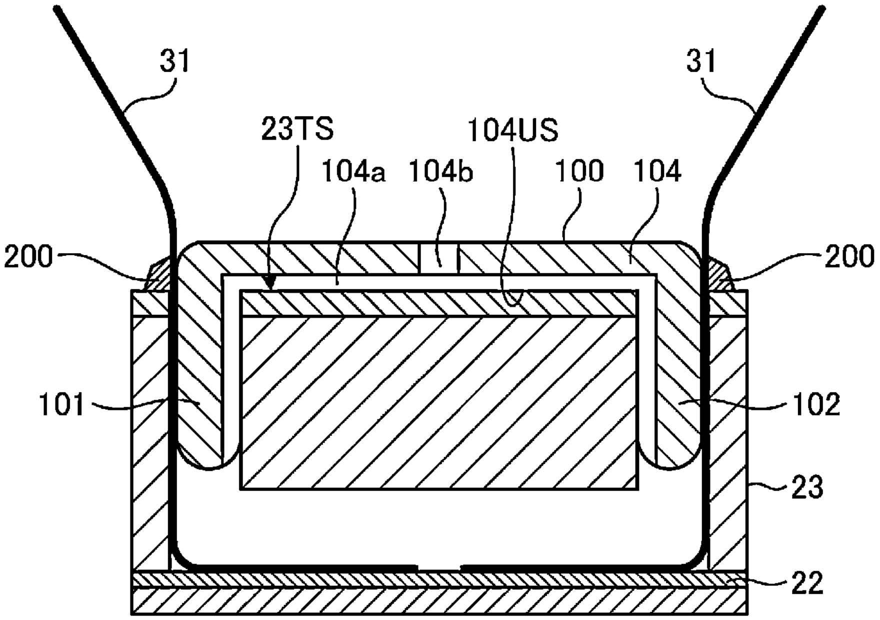
FIG. 14 is a cross-sectional view taken along the line XIV-XIV illustrated in FIG. 10.
Figure 15:
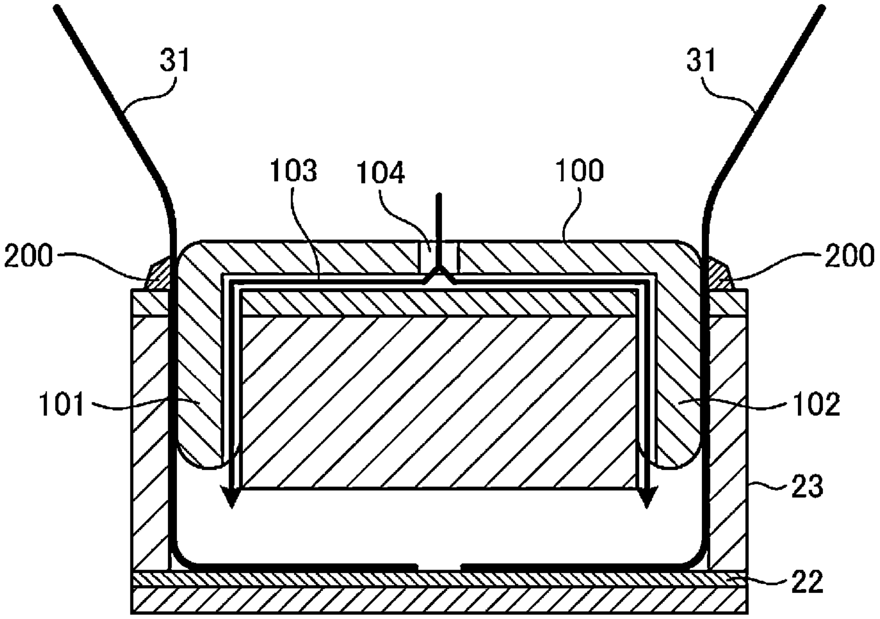
FIG. 15 is an explanatory diagram for checking a sealed condition according to the embodiment.
Figure 16:
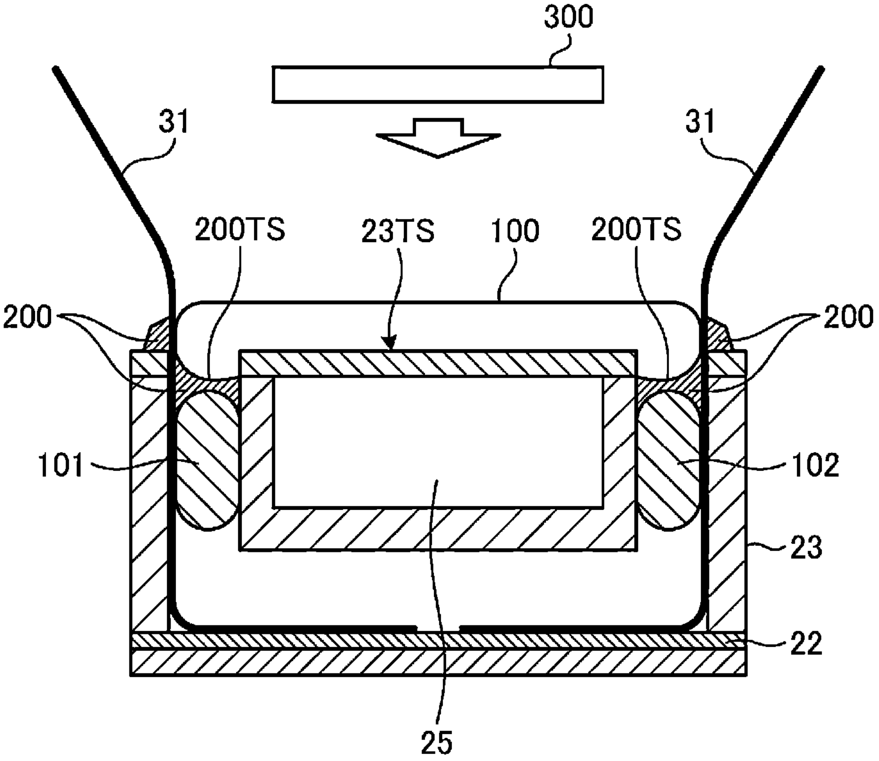
FIG. 16 is a diagram illustrating an example of a component layout according to the embodiment.

A disposed state of the closing member 100 according to the embodiment will be described with reference to FIGS. 11 to 16. FIGS. 11 and 12 are perspective views illustrating an outer appearance configuration of the closing member 100 according to the embodiment. FIG. 13 is a cross-sectional view taken along the line XIII-XIII illustrated in FIG. 10. FIG. 14 is a cross-sectional view taken along the line XIV-XIV illustrated in FIG. 10. FIG. 15 is an explanatory diagram for checking a sealed condition according to the embodiment. FIG. 16 is a diagram illustrating an example of a component layout according to the embodiment.

As illustrated in FIG. 11, the closing member 100 includes a pair of legs 101 and 102 opposed to each other along the longitudinal direction. As illustrated in FIG. 13, the legs 101 and 102 are portions to be inserted into the slit portions 23*b*, and configured with dimensions with which the legs 101 and 102 can close the whole gaps in the slit portions 23*b* and can be inserted into the slit portions 23*b*. The legs 101 and 102 function as portions respectively located in the slit portions 23*b*.

As illustrated in FIG. 11, the closing member 100 includes a connecting portion 103 bridging between one end portions of the legs 101 and 102, and a connecting portion 104 bridging between the other end portions of the legs 101 and 102 along the width direction perpendicular to the longitudinal direction.

As described above, the closing member 100 has a structure in which the legs 101 and 102 to be inserted into the slit portions 23*b* and the connecting portions 103 and 104 connecting the legs 101 and 102 are provided in accordance with the number, the shape, and the size of the slit portions 23*b*. The structure of the closing member 100 facilitates processing at the time of manufacturing.

A lower surface 103US of the connecting portion 103 illustrated in FIG. 13 and a lower surface 104US of the connecting portion 104 illustrated in FIG. 14 come into contact with an upper surface 23TS of the reservoir 23 when the respective legs 101 and 102 are fully inserted into the slit portions 23*b*. This stabilizes the posture of the closing member 100 disposed in the slit portions 23*b*.

Further, as illustrated in FIGS. 13 and 14, after the closing member 100 is disposed in the slit portions 23*b*, the reservoir 23 is sealed by applying a resin (a sealing resin) 200 to the slit portions 23*b*. As described above, according to the embodiment, since the closing member 100 is disposed in the slit portions 23*b*, the amount of a resin used for sealing the slit portions 23*b* can be reduced as compared with the case where the entire slit portions 23*b* are sealed with the resin 200.

In addition, by using the closing member 100 that can be easily disposed in the slit portions 23*b*, the tact time of the process for sealing the slit portions 23*b* can be shortened as compared with the case where the entire slit portions 23*b* are sealed with the resin 200 from the beginning.

In addition, the upper surface 101*a* of the leg 101 illustrated in FIG. 11 has a smooth convex structure raised in an arc shape in a vertically upward direction. Similarly, the upper surface 102*a* of the leg 102 illustrated in FIG. 11 also has a smooth convex structure raised in an arc shape in a vertically upward direction. This makes it easy to seal the slit portions 23*b* with the resin 200.

On the other hand, the lower surface 101*b* of the leg 101 illustrated in FIG. 11 has a smooth convex structure raised in an arc shape in a vertically downward direction in a cross-sectional view. Similarly, the lower surface 102*b* of the leg 102 illustrated in FIG. 11 also has a smooth convex structure raised downward in an arc shape. This facilitates insertion of the closing member 100 into the slit portions 23*b*. The convex structure of the legs 101 and 102 functions as a trap that prevents the resin 200 from flowing into the electrode portion 24 in a case where the resin 200 applied to the slit portions 23*b* leaks from the gap between the closing member 100 and the slit portions 23*b* into the inner region 23*c* of the reservoir 23 (see FIG. 9). That is, the resin 200 leaked from the gap between the closing member 100 and the slit portions 23*b* easily moves along the surfaces of the smooth convex structure of the legs 101 and 102. This can increase the probability that the resin 200 will be solidified before flowing into the electrode portion 24.

Further, by disposing the closing member 100 in the slit portions 23*b* before sealing the slit portions 23*b* with the resin 200, the unsolidified resin 200 can be prevented from flowing into the electrode portion 24 (see FIG. 9), and thus avoiding the occurrence of malfunction.

Incidentally, the closing member 100 is configured such that, when the closing member 100 is disposed in the slit portions 23*b*, the upper surface 101*a* of the leg 101 and the upper surface 102*a* of the leg 102 are lower than the upper surface 23TS of the reservoir 23 (see FIG. 13). This makes it easy to apply the resin 200 so as not to protrude from the slit portions 23*b*.

In addition, for example, the resin 200 can be applied to the slit portions 23*b* in such a manner that an upper surface 200TS of the resin 200 is lower than the upper surface 23TS (the top surface) of the reservoir 23 as in illustrated in FIG. 16. This allows the upper surface 23TS (the top surface) of the reservoir 23 to be used as a region where various components are disposed. For example, when a liquid tank 25 is provided in the reservoir 23 as illustrated in FIG. 16, a region where a heater 300 for controlling the temperature of a liquid is disposed can be secured on the upper surface 23TS (the top surface) of the reservoir 23.

The flexible substrate 31 is extracted outward from the outer side of the closing member 100 disposed in the slit portion 23*b* (see FIGS. 13 and 14). That is, the flexible substrate 31 is temporarily fixed by the closing member 100, and thereby the movement of the flexible substrate 31 can be restrained. This makes it possible to prevent excessive stress from being applied to the electrode portion 24 that is a region to which the flexible substrate 31 and the piezoelectric actuator substrate 22 are electrically connected, by the movement of the flexible substrate 31.

As illustrated in FIG. 12, a channel 104*a* and a channel outlet 104*b* are provided in the lower surface 104US of the connecting portion 104. As illustrated in FIG. 14, the channel 104*a* communicates between the channel outlet 104*b* and the inner region 23*c* of the slit portions 23*b* in a state where the closing member 100 is disposed in the slit portions 23*b*. The channel outlet 104*b* is provided near the center of the connecting portion 104 in the width direction.

As described above, by providing the channel 104*a* and the channel outlet 104*b* in the closing member 100, whether the slit portions 23*b* are completely sealed can be checked. For example, after the closing member 100 is disposed in the slit portions 23*b* and the slit portions 23*b* are sealed with the resin 200, air can be injected from the channel outlet 104*b* as illustrated in FIG. 15 in order to check whether the slit portions 23*b* are completely sealed.

In addition, since the channel outlet 104*b* is provided near the center of the connecting portion 104 in the width direction, checking of the sealed condition can be easily performed. Further, when the lower surface 104US of the connecting portion 104 comes into contact with the upper surface 23TS of the reservoir 23, the connecting portion 104 and the lower surface 104US can increase the sealing performance with respect to the upper surface 23TS of the reservoir 23.

Furthermore, the sealability of the slit portions 23*b* can be increased by sealing the channel outlet 104*b* with the resin 200 after the checking of the sealed condition.

Although embodiments of the present disclosure are described above, the present disclosure is not limited to the embodiments described above, and various modifications can be made without departing from the spirit thereof.

FIG. 7 illustrates an example in which a plurality of slit portions 23*b* are provided in the reservoir 23, but the configuration is not particularly limited to this example. Further, the shape of the slit portion 23*b* illustrated in FIG. 7 is not particularly limited to the example illustrated in FIG. 7, and can be appropriately changed as necessary.

The embodiment disclosed by the present application can be modified without departing from the main point or the scope of the present invention. In addition, the embodiment disclosed by the present application can be combined as appropriate. For example, the embodiment described above can be modified in the following manner.

Figure 17:
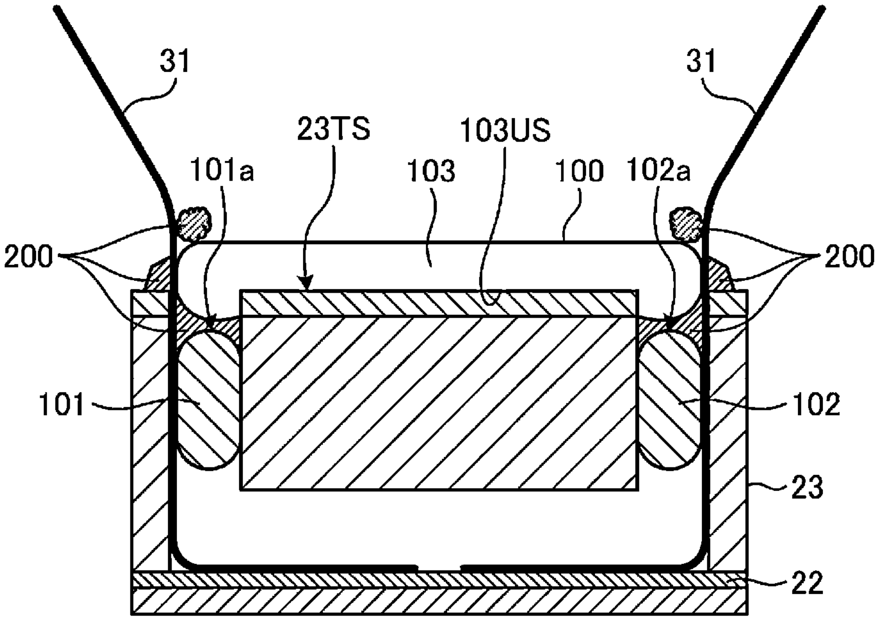
FIG. 17 is a cross-sectional view according to a modified example.

FIG. 17 is a cross-sectional view according to a modified example. As illustrated in FIG. 17, resin sealing may be performed in such a manner that, with the flexible substrate 31 extracted outward from the slit portion 23*b* (see FIGS. 7, 8, and 10), the closing member 100 is disposed in the slit portion 23*b*, and then the resin 200 is applied to the outside and the inside of the flexible substrate 31.

Figure 18:
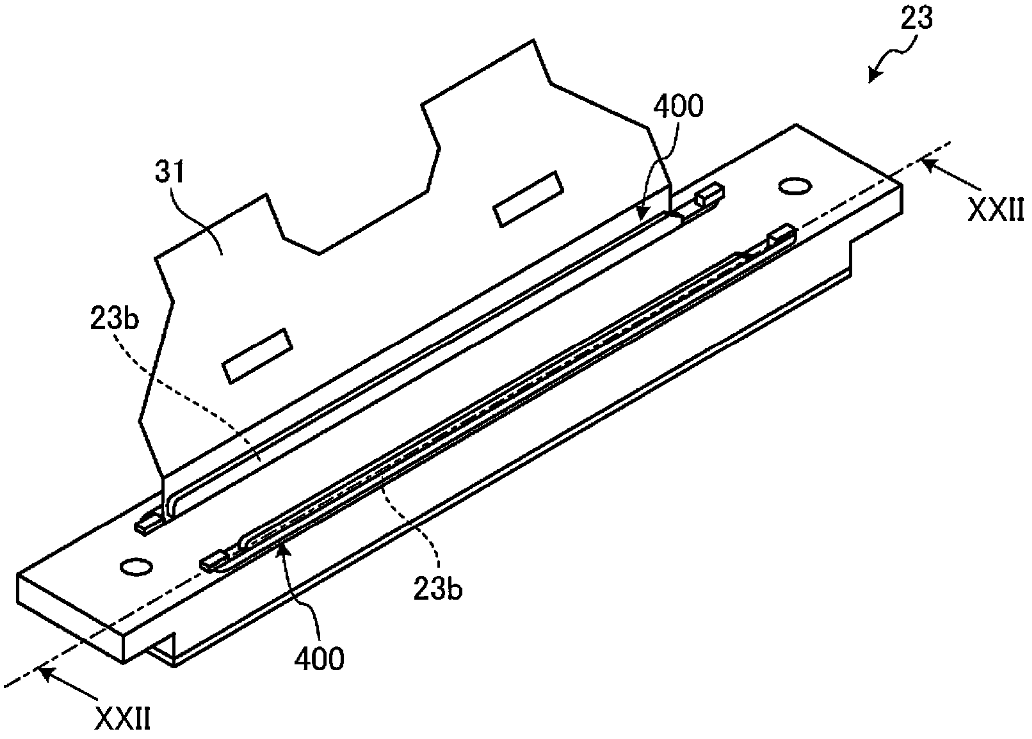
FIG. 18 is a perspective view illustrating an outer appearance configuration in a state where a closing member according to a modified example is disposed.

Alternatively, the shape of the closing member 100 described in the above embodiment may be changed as described below. FIG. 18 is a perspective view illustrating an outer appearance configuration in a state where a closing member according to a modified example is disposed.

Figure 19:
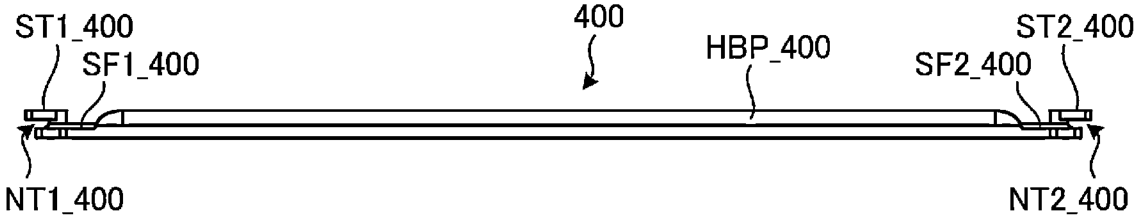
FIG. 19 is a side view of a closing member according to a modified example.
Figure 20:
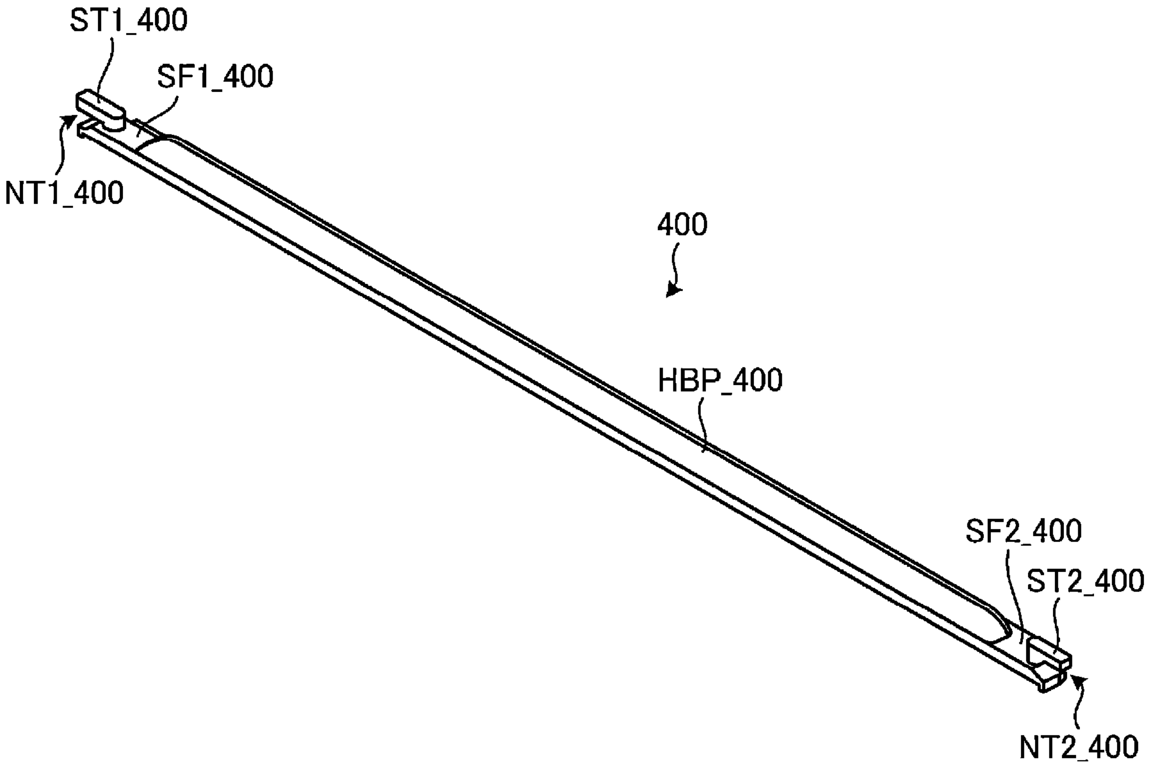
FIG. 20 is a perspective view of an outer appearance of a closing member according to a modified example as viewed from above.
Figure 21:
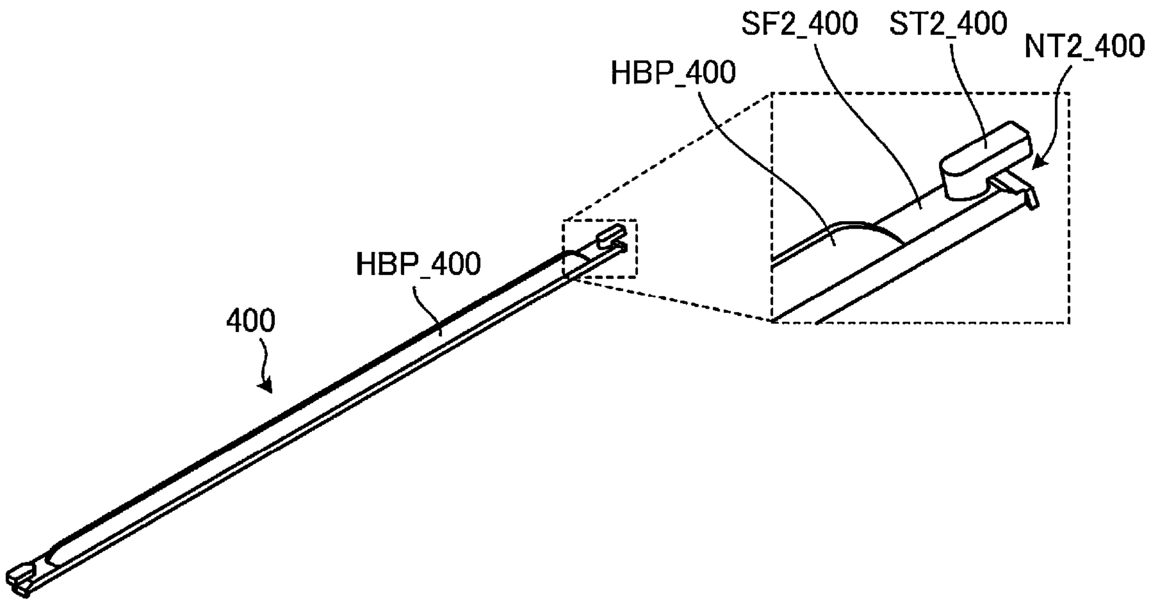
FIG. 21 is a partially enlarged view illustrating an end portion of a closing member according to a modified example.
Figure 22:
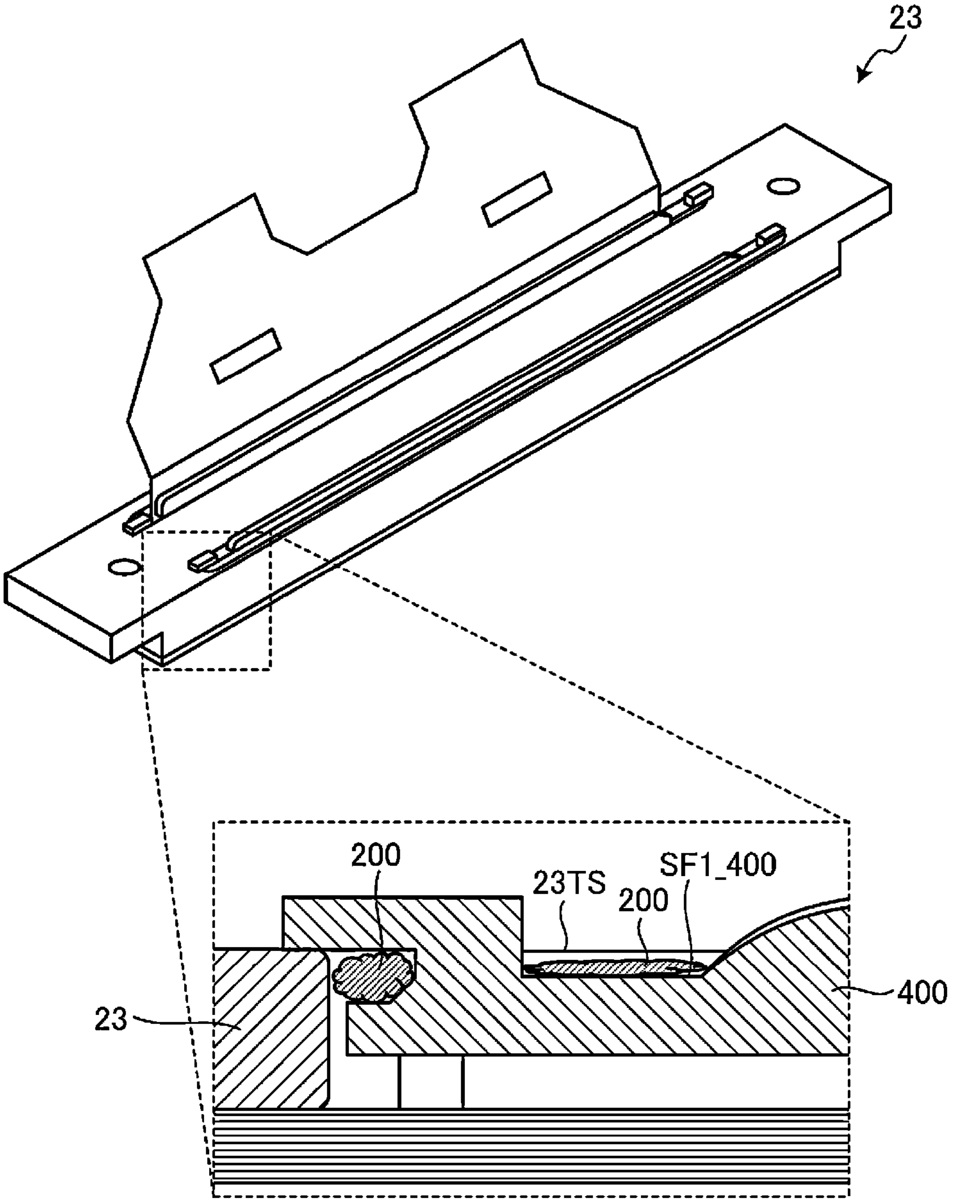
FIG. 22 is a partially enlarged view of a cross-section taken along the line XXII-XXII illustrated in FIG. 18.

As illustrated in FIG. 18, a closing member 400 according to a modified example is disposed in each of a pair of slit portions 23*b* of the reservoir 23 so as to close the slit portions 23*b*. The closing member 400 has a rod shape along the shape of the slit portion 23*b*. FIG. 19 is a side view of a closing member according to a modified example. FIG. 20 is a perspective view of an outer appearance of a closing member according to a modified example as viewed from above. FIG. 21 is a partially enlarged view illustrating an end portion of a closing member according to a modified example. FIG. 22 is a partially enlarged view of a cross-section taken along the line XXII-XXII illustrated in FIG. 18. In the following description, unless it is necessary to particularly distinguish between substantially the same portions, such portions will be described without particular distinction, only by assigning the same reference signs, for example, a claw ST_400, a notch NT_400, and a top surface SF_400.

As illustrated in FIGS. 19 to 21, the closing member 400 includes a convex structure portion HBP_400 having a substantially semicircular cross-section raised in an upward direction in the longitudinal direction of the closing member 400. This facilitates resin sealing after the closing member 400 is disposed in the slit portion 23*b*. In addition, since the slit portion 23*b* is easily filled with a resin, the rigidity of the slit portion 23*b* can be expected to be increased.

Further, as illustrated in FIGS. 19 to 21, a claw ST1_400 is provided at one end portion of the closing member 400, and a claw ST2_400 is provided at the other end portion of the closing member 400. The closing member 400 is supported at a predetermined position by the claws ST_400 being caught on the top surface 23TS of the reservoir 23 at the both end portions of the slit portion 23*b* in the longitudinal direction instead of being buried in the slit portion 23*b*. By providing the claws ST_400, the closing member 400 can be prevented from being buried in the slit portion 23*b*. Meanwhile, the closing member 400 can be positioned at an appropriate position.

Further, as illustrated in FIGS. 19 to 21, a notch NT1_400 continuous from the claw ST1_400 is provided at one end portion of the closing member 400, and a notch NT2_400 continuous from the claw ST2_400 is provided at the other end portion of the closing member 400. By providing the notches NT_400, a sealing resin can spread around the closing member 400.

As illustrated in FIG. 19 or FIG. 21, the closing member 400 has a structure in which the position of a top surface SF1_400 of a connecting portion connecting the claw ST1_400 and a convex structure portion HBP_400 is lower than the top surfaces of the claw ST1_400 and the convex structure portion HBP_400 in the cross-sectional direction of the closing member 400. Similarly, the height of a top surface SF2_400 of a portion connecting the claw ST2_400 and the convex structure portion HBP_400 is lower than the claw ST2_400 and the convex structure portion HBP_400.

Besides, when the closing member 400 is disposed in the slit portion 23*b*, the top surface SF_400 of the portion connecting the claw ST_400 and the convex structure portion HBP_400 is positioned at a position lower than the top surface TS of the reservoir 23. To give a concrete example, as illustrated in FIG. 22, the position of the top surface SF1_400 of the portion connecting the claw ST1_400 and the convex structure portion HBP_400 is lower than the position of the top surface 23TS of the reservoir 23 in the cross-sectional direction of the reservoir 23. The top surface SF_400 of the connecting portion included in the closing member 400 is a surface on which the resin applied to the slit portion 23*b* is attached. This allows the resin to be applied to the slit portion 23*b* without spreading from the slit portion 23*b*. Further, a space to place components can be secured on the upper surface (the top surface) of the reservoir 23.

The invention claimed is:

1. A liquid droplet discharge head, comprising:
a reservoir comprising a slit portion through which a flexible substrate is extracted outward, the slit portion forming an opening in an upper surface of the reservoir;
a closing member in the slit portion; and
a sealing resin on the closing member, wherein
an upper surface of the closing member is in a convex shape with an upward arc, and
the upper surface of the closing member is lower than the opening in the upper surface of the reservoir formed by the slit portion.

2. The liquid droplet discharge head according to claim 1, wherein a lower surface of the closing member is in a convex shape.

3. The liquid droplet discharge head according to claim 1, wherein the flexible substrate is extracted outward from an outer side of the closing member disposed in the slit portion.

4. The liquid droplet discharge head according to claim 1, wherein an upper surface of a resin applied to the slit portion is lower than a top surface of the reservoir.

5. The liquid droplet discharge head according to claim 1, wherein the reservoir comprises a plurality of the slit portions.

6. The liquid droplet discharge head according to claim 1, wherein the closing member has a rod shape along a shape of the slit portion and comprises a convex portion having a cross-section raised upward in a longitudinal direction of the closing member.

7. The liquid droplet discharge head according to claim 6, wherein the closing member comprises a claw on both end portions of the closing member, the claw supporting the closing member.

8. The liquid droplet discharge head according to claim 7, wherein the closing member comprises a notch continuous from the claw on both end portions of the closing member.

9. The liquid droplet discharge head according to claim 8, wherein the closing member comprises a structure in which a top surface of a connecting portion connecting the convex portion and the claw is lower than a top surface of the reservoir.

10. A recording device, comprising the liquid droplet discharge head according to claim 1.

11. A liquid droplet discharge head comprising:
a reservoir comprising a slit portion through which a flexible substrate is extracted outward;
a closing member in the slit portion; and
a sealing resin on the closing member, wherein
a channel communicating with outside is provided inside the closing member,
the reservoir comprises a plurality of the slit portions,
the closing member comprises portions to be respectively disposed in the plurality of slit portions and a connecting portion connecting the portions, and
an outlet of the channel is provided in the connecting portion of the closing member.

12. The liquid droplet discharge head according to claim 11, wherein the outlet of the channel is sealed with the sealing resin.

* * * * *